US005765350A

United States Patent [19]

Ochse

[11] Patent Number: 5,765,350
[45] Date of Patent: Jun. 16, 1998

[54] FRUIT PICKING SHAKER ROD

[75] Inventor: Peter George Ochse, Berri, Australia

[73] Assignee: Berri Mechanical Harvesters Pty Ltd., Australia

[21] Appl. No.: 807,068

[22] Filed: Feb. 27, 1997

[30] Foreign Application Priority Data

Feb. 27, 1996 [AU] Australia .................. PN8314

[51] Int. Cl.⁶ .................................. H01D 46/24
[52] U.S. Cl. .................. 56/328.1; 56/330; 56/340.1; 56/DIG. 19
[58] Field of Search .................. 56/328.1, 329, 56/330, 332, 339, 340.1, DIG. 19

[56] References Cited

U.S. PATENT DOCUMENTS

| 848,876 | 4/1907 | Berger, Jr. .................. 56/339 |
| 3,483,687 | 12/1969 | Tanner, Jr. .................. 56/328.1 |
| 3,491,521 | 1/1970 | Danford .................. 56/328.1 |
| 3,845,610 | 11/1974 | Sharp et al. .................. 56/328.1 |
| 4,077,193 | 3/1978 | Diggs .................. 56/330 X |
| 4,508,062 | 4/1985 | Berry et al. .................. 56/328.1 X |

*Primary Examiner*—Terry Lee Melius
*Assistant Examiner*—Heather Shackelford
*Attorney, Agent, or Firm*—Klauber & Jackson

[57] ABSTRACT

This invention provides an improved shaker rod for a shaker type fruit harvester machine comprising a rigid mounting portion at one end of the rod arranged to be rigidly secured directly to a support member on the machine, a deflectable free end portion at its other end, and an intermediate elongate portion extending between said ends, the rod being constructed so that its strength and stiffness varies between its ends whereby the rod is less stiff and therefore more flexible in the region of its free end than at its fixed one end. Preferably the free end portion comprises an enlarged bulbous formation which has a convexly curved end wall.

13 Claims, 2 Drawing Sheets

FRUIT PICKING SHAKER ROD

This invention relates to the field of harvesting equipment which is used to shake the fruit from bushes and trees and in particular to shaker rods for such equipment.

BACKGROUND

Shaking fruit from bushes and trees is one of many ways to harvest fruit and is performed in such a way as to minimise damage during harvesting and subsequent handling.

A large variety of shaker type harvesting machines are known to the present inventor, with each machine providing different means for applying the necessary vibratory force to the bushes and trees sufficient to dislodge the fruit.

The basic elements of a shaker type harvesting machine comprise a shaker frame constructed to support a plurality of shaker rods (being elements which make vibratory contact with the bush or tree), a vibratory energy source for vibrating the shaker frame, and a fruit collection apparatus which is mounted below the shaker frame so that as the frame vibrates, the fruit is dislodged from the bush or tree and gathered by the collection apparatus which may also be arranged to convey the harvested fruit to a packing bin.

Various types of shaker rods each having their own advantages and disadvantages, are known and used in the industry. One known type of shaker rod which has a constant cross-section along its length, is known to exhibit uncontrollable oscillations when vibrated through the shaker frame being due in part to a combination of factors which include the density of the rod, its length, the oscillation frequency and positional arrangement of the rods on the shaker frame.

Uncontrolled oscillations of the shaker rod ends can unnecessarily harm the fruit and/or bushes and trees and decrease the yield of the harvest.

Additionally, it is known for the shaker rods to wear at their free ends into points and knife-like edges which can exacerbate the damage to bushes and trees being harvested. Shaker rods of this type which are made of fibreglass are known to delaminate and quickly deteriorate thereby decreasing their functionality and longevity.

Some shaker elements are shaped into the form of a loop but these have been found to have an uneven shaking characteristic, some becoming uncontrolled. It is also known that loop-type shakers do not efficiently work around wide trellises bearing fruit laden bushes or vines and occasionally "catch" on the bush or vine and their supporting posts and in some cases the irrigation equipment, causing considerable damage which can be expensive to repair.

It is also known for shaker rods to be fastened to the shaker frame by means of holders. However, it is not uncommon for the rods to detach themselves from their holders during use, due to the fracturing or wearing out of the rods in the region of their fastened end portions.

While these prior arrangements are generally effective, there is a need for improvement and it is an object of the present invention to provide a shaker rod which will obviate or at least reduce some of the abovementioned problems.

BRIEF DESCRIPTION OF THE INVENTION

According to this invention therefore, there is provided a shaker rod for a shaker-type fruit harvester machine comprising a unitary, essentially planar shaker rod element having a proximal end and a distal end, a rigid mounting portion at its proximal end, said mounting portion being adapted for rigid securement directly to a shaker rod support frame on the machine, a deflectable free end portion at its distal end, and an intermediate elongate portion extending between said ends, said intermediate portion having a stiffness which is reduced in the direction of said distal end whereby said rod is less stiff and therefore more flexible in the region of its distal end than at its proximal end. Preferably, the intermediate portion has a thickness at its inner end which is large relative to the thickness at its outer end, and desirably is formed with a tapered section which joins said mounting portion.

Desirably, the mounting end portion is formed with one or more bolt receiving holes extending transversely therethrough whereby the rod can be fastened directly to the shaker frame.

Desirably, the structural stiffness and strength of the intermediate rod portion is progressively reduced in the direction of the distal end of the rod.

Desirably, the striker end of the rod comprises an enlarged bulbous portion which has a curved end surface.

Desirably, the rod is formed to be essentially linear.

Several preferred embodiments of the invention will now be described in some further detail with reference to and as illustrated in the accompanying figures wherein;

FIG. 5 depicts a rear view of the shaker frame shown in FIG. 4 while

DETAILED DESCRIPTION OF AN EMBODIMENT OF THE INVENTION

Figure 1:
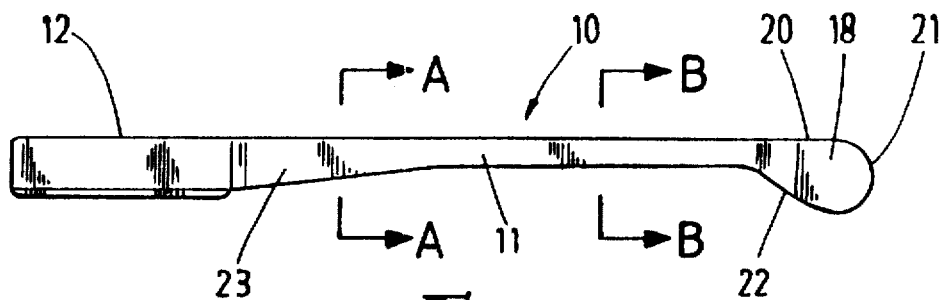
FIG. 1 depicts a plan view of a shaker rod according to a first embodiment of the invention.
Figures 2A, 2B:
FIGS. 2A and 2B depict cross-sectional views along A—A and B—B respectively of the shaker rod shown in FIG. 1.
Figure 3:
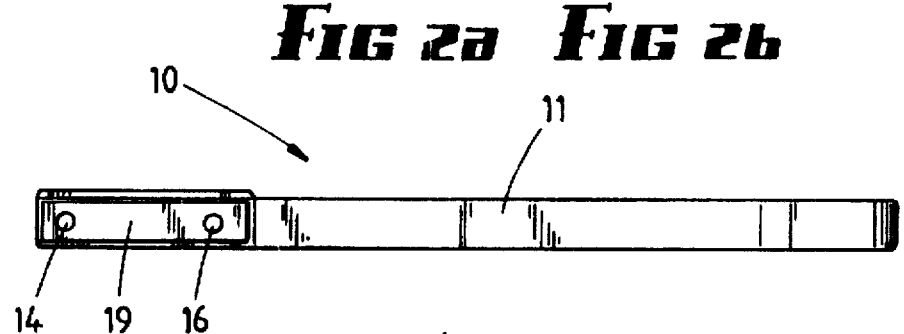
FIG. 3 depicts a side view of the shaker rod shown in FIG. 1.

Referring to the embodiment shown in FIGS. 1 to 3 of the drawings, an elongate shaker rod 10 has a thickened proximal or mounting end portion 12, an intermediate elongate portion 11, and an enlarged distal free end portion 18. The length of the shaker rod 10 which in this embodiment is used for shaking trellis supported grape vines, is about 1.2 m. The proximal end 12 is arranged to be directly fixed to a shaker frame on the grape harvester machine by means of fastener bolts (not shown) and a clamping plate 19 which clamps against one of the vertical sides of end portion 12. The bolts are located in transverse through holes 14 and 16 (refer FIG. 3) which extend through the thickness of the end portion 12, the holes 14, 16 lying in the central horizontal plane of the shaker rod 10.

In this embodiment, the rod 10 is a planar one-piece member and constructed of reinforced fibreglass. The free end portion 18 has a bulbous shape (in plan) and has a flat front striker surface 20 which joins to a convexly curved end surface 21 which joins to a ramp surface 22 which in turn joins to the rear planar surface of the intermediate portion 11. The end portion 18 is shaped so as to allow for wear of the edge 20 which makes contact with the bushes or trees, in a manner so that unwanted sharpening of the distal end of the rod is avoided. From field trials performed by the inventor herein, it has also been found that the enlarged bulbous distal end portion results in a more controlled oscillation of the rod 10.

FIGS. 2A and 2B depict the cross-sectional shapes of the shaker rod 10 at A—A and B—B respectively of FIG. 1, ie at locations on the shaker rod between its fixed and free ends 12, 18, respectively.

In this embodiment, the intermediate portion 11 of the rod 10 has a tapered inner section 23 so that the cross-sectional area of the portion 11 decreases in the direction of the free or distal end 18 as depicted pictorially by FIG. 2B. The tapering in this embodiment provides one way of strengthening and stiffening the rod 10 at its fixed end and being less stiff and hence more flexible at its free end. However, this tapering may not be required since it is also possible for the characteristics of the rod material to impart the desired rigidity at the fixed end as well as the required flexibility at the free end.

The transition from rigid to flexible is graduated and can be achieved, for example, by varying the thickness of the rod 10 and the amount of fibreglass reinforcement material which is used along the length of the rod 10. In this embodiment the stiffness of the rod is varied along its length by using a plurality of overlapping layers of resin impregnated fibreglass rovings, with each layer extending from the proximal end of the rod, the lengths of the rovings progressively increasing in the direction of the distal end of the rod 10. The density of rovings at the proximal end is thus greater than that at the distal end of the rod, and progressively decreases in the direction of the distal end, to thereby provide the stiffness and strength variation which is required along the length of the rod. The degree of stiffness and strength will be influenced by the type of crop being harvested.

The rods 10 can be conveniently moulded from a fibreglass reinforced resin, eg a polyester resin. This would entail preparing different lengths of fibreglass rovings (some of which will have different strand densities), impregnating the rovings with the resin, eg by means of squeeze rollers, removing excess resin to form the required cross-sectional thicknesses, placing the differing lengths of resin impregnated rovings in horizontal layers in a mould cavity shaped to form the rod 10 with the layers having their inner ends vertically aligned (or nearly so), adding additional resin and vibrating the mould to remove unwanted air bubbles. Resin could also be injected under pressure into the mould in order to remove excess air bubbles.

Alternatively, the rod can be formed of a suitably strong synthetic polymeric material, eg "kevlar", and shaped and sized so as to provide greater strength and rigidity at its fixed end than at its free end.

Figure 4:
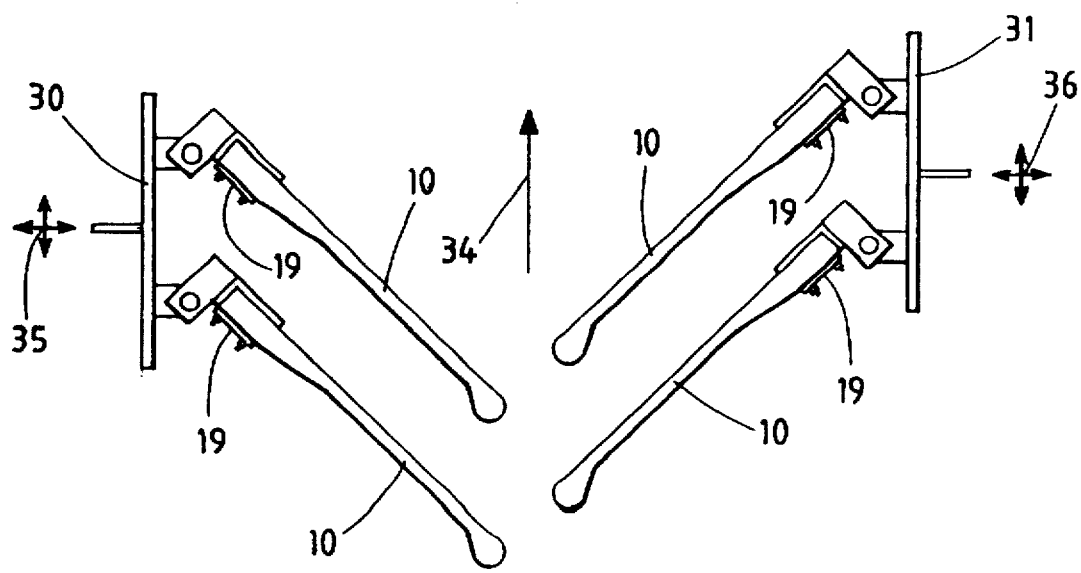
FIG. 4 depicts a plan view of a shaker frame to which are fitted vertical rows of shaker rods.

FIG. 4 is a schematic plan view of a typical shaker frame assembly of a fruit harvester machine, the assembly comprising opposed vertical shaker frames 30, 31 to which are rigidly fixed the shaker rods 10 by means of fixing bolts and clamp plates 19 (refer FIG. 3).

In operation, the machine proceeds in the direction of arrow 34 so as to place the shaker rods 10 against two sides of, in this example, grape vines supported by long trellises. The free ends of the shaker rods 10 are sufficiently flexible to compress the vine foliage towards the trellis but not too stiff so as to unnecessarily damage the vine.

Each shaker frame 30, 31 has its own vibratory energy source 35, 36 respectively, which in this embodiment, is an hydraulic motor and an eccentrically driven spindle connected to the shaker frame.

Each frame 30, 31 may be driven in phase or may be driven in different phase to the other. Each frame may be driven at the same or different oscillation frequencies. In this embodiment, each frame is driven at the same oscillation frequency (approximately 320 rpm) and at 180° out-of-phase so that they vibrate in unison but in opposite directions.

The embodiment shows each frame 30, 31 supporting a set of leading shaker rods and a set of trailing shaker rods. However, more than two sets of rods may be supported along the length of each of the frames.

Figure 5:
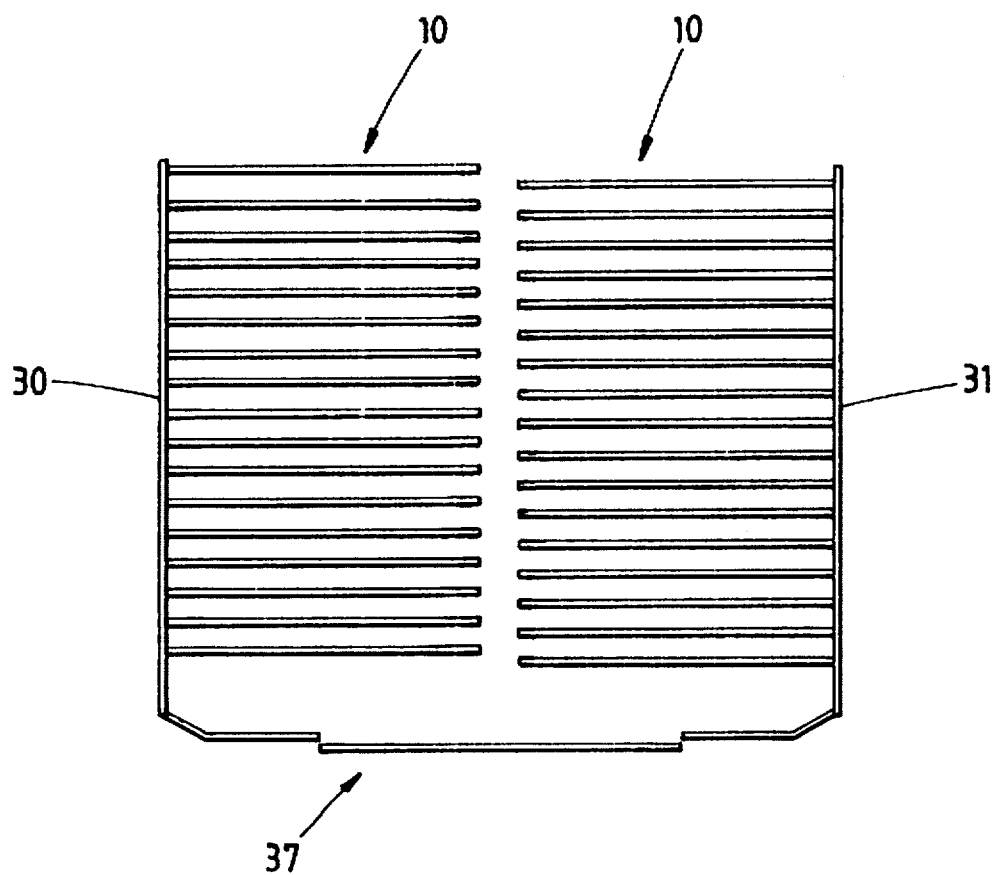

As depicted in FIG. 5, the shaker rods 10 on each frame 30, 31 are arranged in two lengthwise spaced vertical rows, with the rods on one frame being staggered with respect to those on the other frame. However, this is merely a preferred arrangement for grape vines and in particular certain varieties of grapes. Different rod arrangements will normally be required for different bushes, vines, trees and species thereof.

The area below the shaker rods 10 in FIG. 5 depicts an arrangement of conveyor plates 37 which are positioned to form a catchment for the fruit as it is shaken loose of the bush, tree or vine, and arranged to convey the fruit to a suitable container. Such arrangements are well-known.

Figure 6:
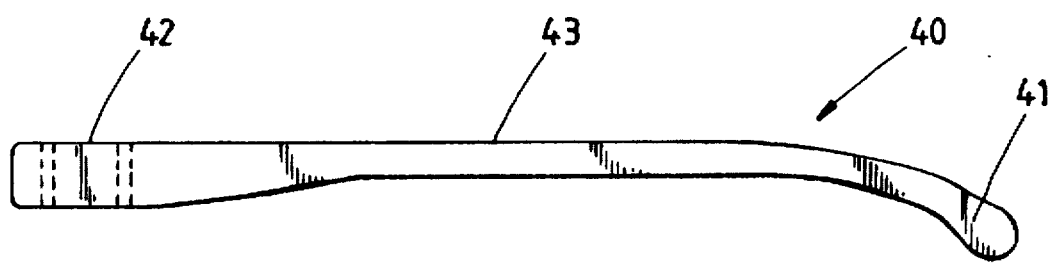
FIG. 6 is a view similar to FIG. 1 showing a shaker rod made in accordance with a second embodiment of the invention.

Referring to the second embodiment shown in FIG. 6 of the drawings, the rod 40 has a partly curved profile (in plan) and is formed with a bulbous free end 41, a thickened mounting end portion 42 and a tapered intermediate section 43, the free end 41 joining to a rearwardly curved portion of the intermediate section 43 of the rod, whereby the end 41 is laterally offset from the mounting portion 52. The rearwardly curved free end of the rod 40 has been found suitable in cases where a gentler striking action in order to shake the fruit from the bush is needed.

It will be appreciated by those skilled in the art, that the invention is not restricted in its use to the particular application described, nor is it restricted to the features of the preferred embodiment described herein. It will also be appreciated that various modifications can be made without departing from the principles of the invention, therefore, the invention should be understood to include all such modifications within its scope.

I claim:

1. A shaker rod for a shaker-type fruit harvester machine, the shaker rod being formed as a substantially planar one piece solid rod element having a proximal end and a distal end, said rod element comprising a rigid mounting portion at its proximal end adapted for rigid securement directly to a shaker rod support frame on the machine, and an intermediate elongate portion of reduced cross-section intermediate and spaced from said mounting portion and said distal end, said rod element being constructed so that its rigidity and hence its stiffness is varied along its length with said mounting portion having a high stiffness and said portion of reduced cross-section having a relatively low stiffness.

2. A shaker rod according to claim 1 comprising an enlarged substantially bulbous portion at said distal end of the rod.

3. A shaker rod according to claim 1 or claim 2 wherein said intermediate portion of reduced cross-section comprises a tapered section which joins said mounting portion.

4. A shaker rod according to claim 2 wherein said bulbous portion has a convexly curved end surface.

5. A shaker rod according to claim 1 or claim 2 wherein said rod is essentially linear.

6. A shaker rod according to claim 1 or claim 2 wherein said distal end of said rod element is rearwardly curved with respect to the direction of travel.

7. A shaker rod according to claim 1 or claim 2 wherein a front or leading face of said rod element is planar.

8. A shaker rod according to claim 1 or claim 2 wherein said mounting end portion is formed with one or more fastener receiving holes extending transversely therethrough whereby the rod can be fastened directly to a shaker frame.

9. A shaker rod according to claim 1 wherein said rod is constructed of fibreglass reinforced plastics material.

10. A shaker rod according to claim 9 wherein said plastics material is a polyester resin.

11. A shaker rod according to either claim 9 or claim 10 wherein the fibreglass reinforcement comprises layers of overlapping rovings, the lengths of which progressively increase in the direction of the distal end of the rod, whereby the density of rovings at the proximal end of the rod element is greater than that at said distal end.

12. A shaker rod according to claim 1 or claim 2 wherein the rigidity of said intermediate portion progressively decreases in the direction of the distal end of the rod element.

13. A shaker rod according to claim 2 wherein the intermediate portion of the rod element is of rectangular cross-section along its length.

* * * * *